Nov. 28, 1967  W. C. SWANSON ETAL  3,354,981
HAND CONTROL MECHANISM FOR VEHICLE WITH
HYDROSTATIC TRANSMISSION
Filed March 7, 1966  5 Sheets-Sheet 1

Inventors:
William C. Swanson
John S. Lam
Donald W. Moyer
By Walter G. Gerry
Atty.

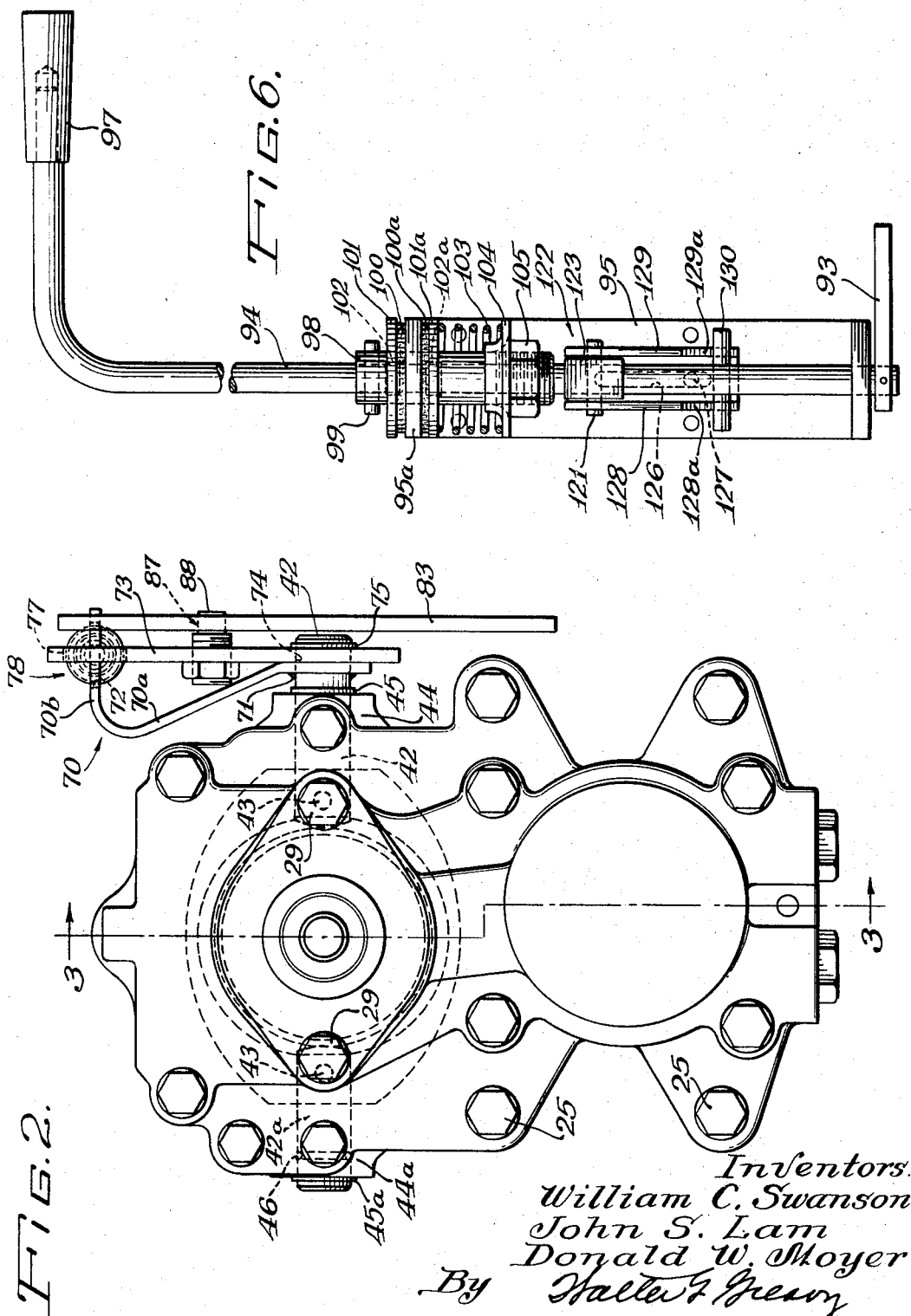

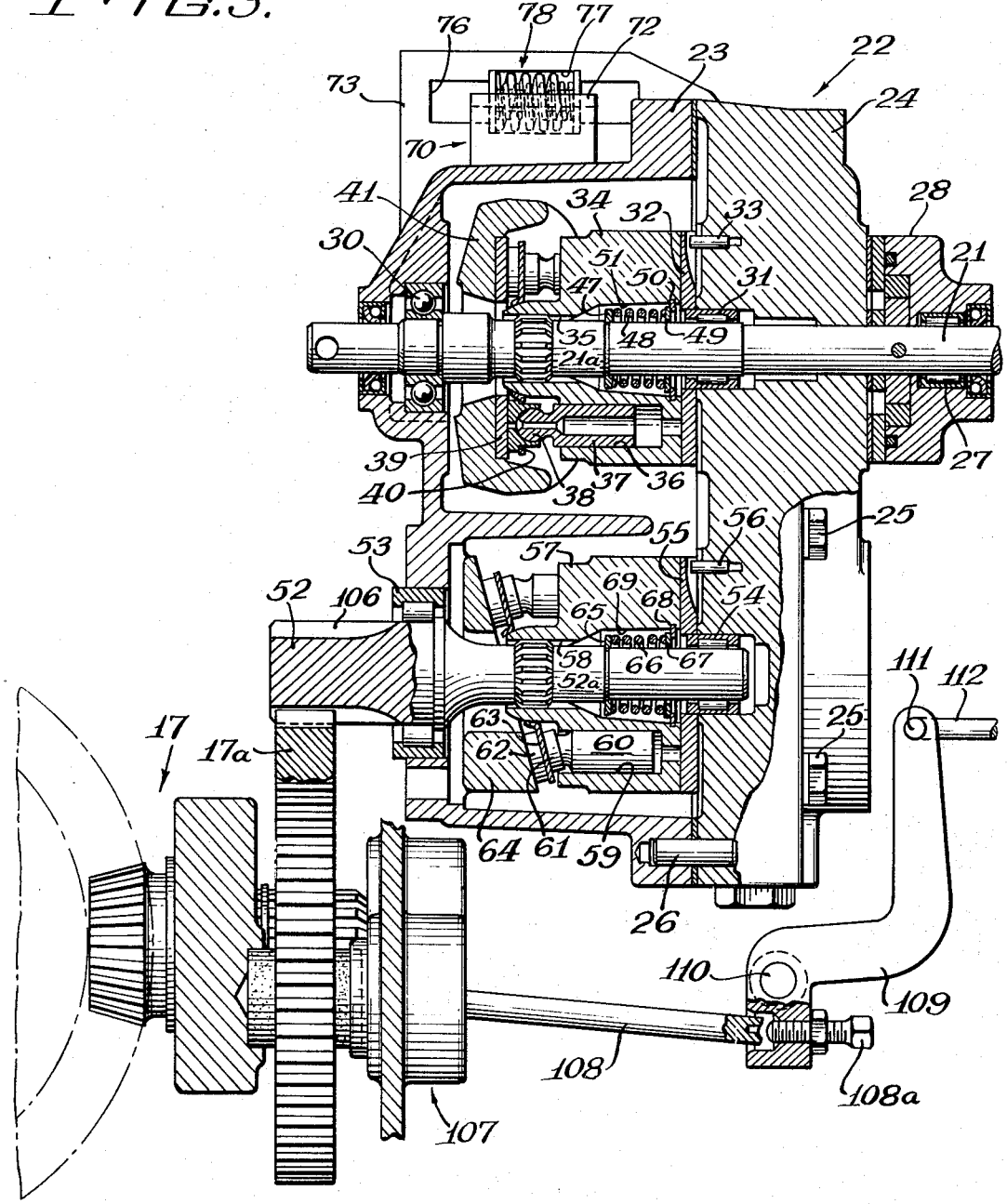

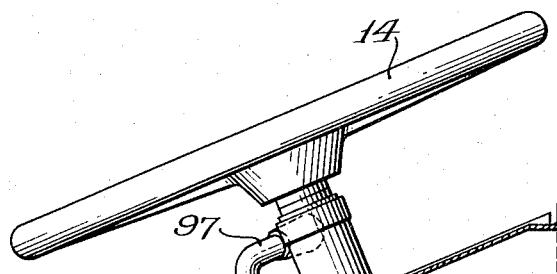
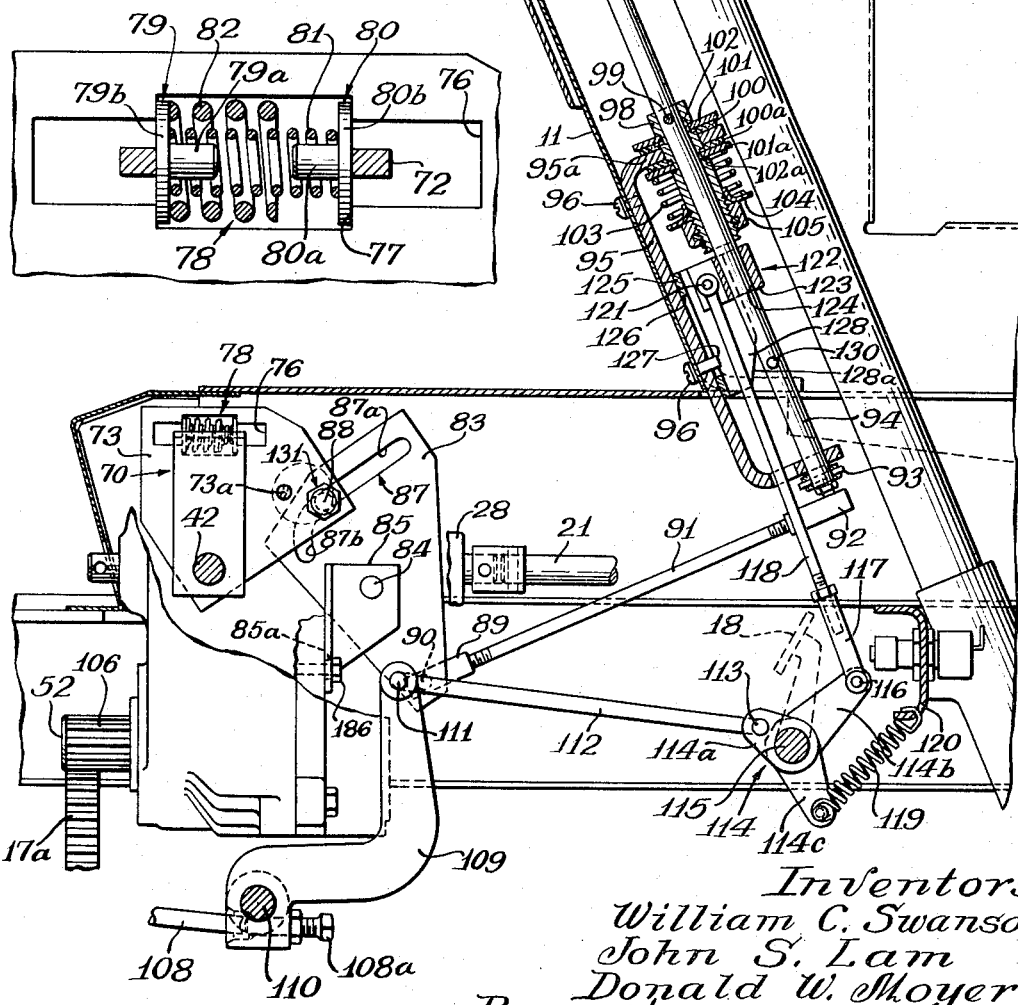

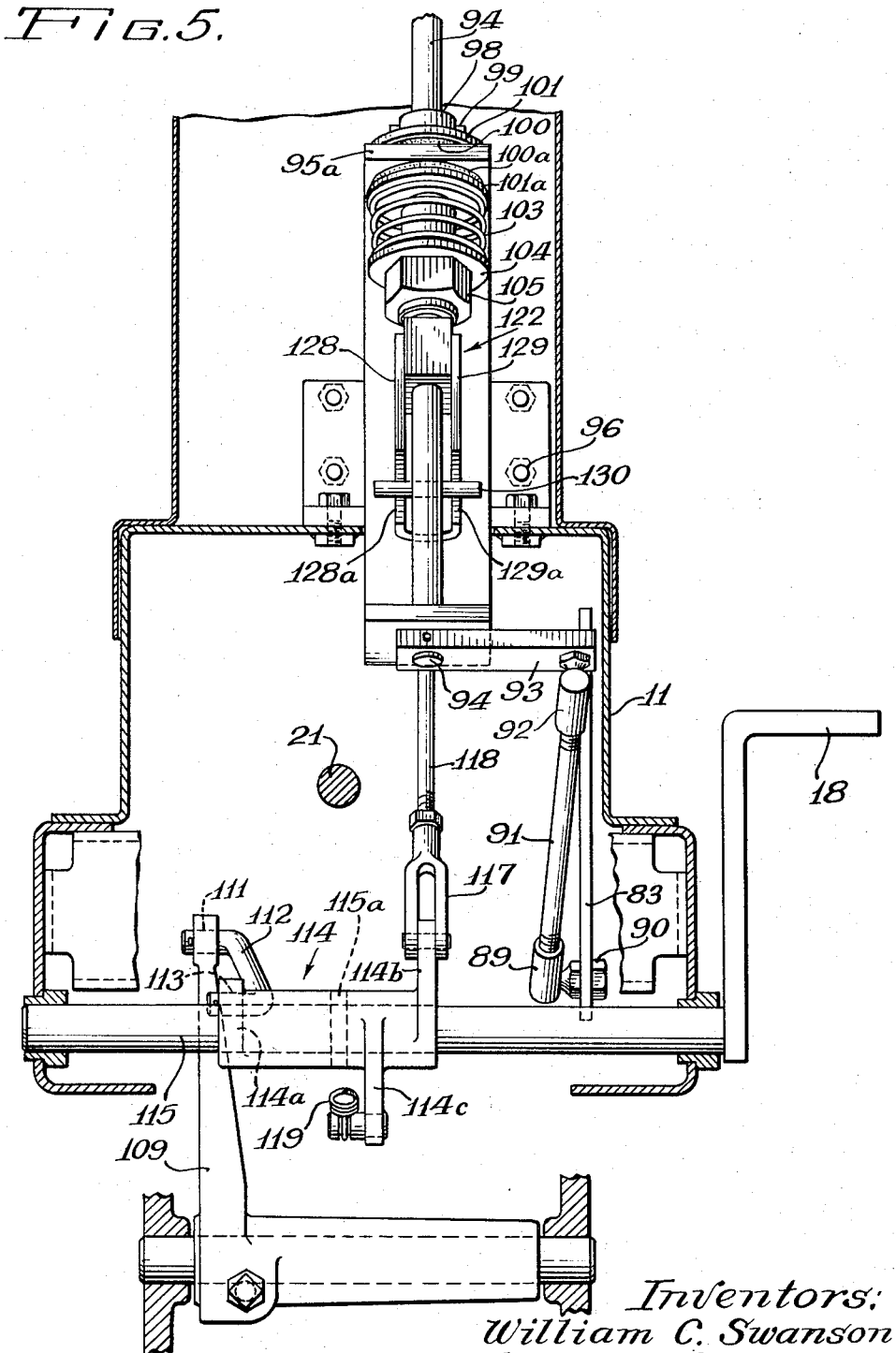

United States Patent Office 3,354,981
Patented Nov. 28, 1967

3,354,981
HAND CONTROL MECHANISM FOR VEHICLE WITH HYDROSTATIC TRANSMISSION
William C. Swanson and John S. Lam, Clarendon Hills, and Donald W. Moyer, Downers Grove, Ill., assignors to International Harvester Company, a corporation of Delaware
Filed Mar. 7, 1966, Ser. No. 532,217
10 Claims. (Cl. 180—77)

This invention relates to vehicle speed control mechanisms, but more particularly it is concerned with control mechanism for controlling the tilt of a swash plate in the hydraulic drive pump of a hydrostatic transmission adapted for incorporation in a propellable vehicle.

In hydrostatic transmission units the swash plate of the hydraulic drive pump is customarily rotatable about an axis transverse to the axis of rotation of axially displaceable piston elements of said pump so as to provide a variable output from the pump as well as to control the directional flow of fluid therefrom whereby the direction of rotation of an associated fluid motor, frequency employed for propelling a vehicle, is controlled. In vehicles incorporating such a transmission therein it is highly desirable that the transmission be shifted to its neutral position before braking the vehicle so to avoid braking against the power being transmitted to the traction wheels from the vehicle engine by way of the hydrostatic transmission therein. It has been customary in vehicles of this character to provide hand operated mechanisms for controlling the power output of the hydraulic drive pump as well as the directional flow of fluid therefrom so as to control direction of motion of the vehicle, thus requiring the vehicle operator to manually actuate such mechanism before applying the vehicle brakes. Hence if the operator should fail to actuate such mechanism either because of neglect or otherwise having his hands inaccessible to do so, or in event of an emergency and not having time to effect the necessary actuation thereof, the operator will be forced to brake against engine power with the additional possibility of stalling the engine by such action. The present invention thus is directed to preventing such contingency by providing means which couples together the braking and transmission control mechanisms.

The primary object of the present invention therefore, is to provide a novel means for coupling the braking mechanism of a vehicle with the speed and directional control mechanism of a hydrostatic transmission in the vehicle whereby upon actuation of the braking mechanism beyond a predetermined point the hydrostatic transmission thereof is automatically returned to neutral and retained therein until subsequent release of the braking mechanism.

Another object is to provide mechanical means operable by a portion of the braking mechanism of a vehicle for returning a normally hand operated control mechanism to a position such that an interconnected swash plate of a hydrostatic transmission is concomitantly returned to a neutral position whereupon no power is transmitted to the traction wheels of the vehicle so long as the braking mechanism is effective for braking the vehicle against the motion of travel.

A further object is to provide in a vehicle having a hydrostatic transmission therein mechanically operative mechanisms for controlling the speed and direction of motion of the vehicle and the braking thereof which mechanisms are interlockable to prevent actuation of the speed and direction of motion control mechanism when the braking mechanism is in position for braking the vehicle against motion.

A still further object is to provide linkage mechanism including a longitudinally movable cam element engageable with a rotatable pin element of a vehicle speed and direction of motion control mechanism wherein the cam element is operable responsive to operation of the braking mechanism of the vehicle for engaging said pin element to cause the speed and direction of motion control mechanism to return to a neutral position and to retain said control mechanism against displacement from such neutral position while said cam and pin elements are so engaged and wherein upon release of said braking mechanism the said cam element is returned to a position of disengagement with said pin element.

A yet still further object is to provide means for imparting smooth angular displacement to the rotatable swash plate of the hydraulic drive pump of a hydrostatic transmission unit and for returning the swash plate thereof to a neutral position upon application of the braking mechanism to the traction wheels of an associated vehicle.

The foregoing and other objects and features of the invention will become apparent as the disclosure is more fully made in the following description of a preferred embodiment of the invention as illustrated in the accompanying sheets of drawings in which:

FIGURE 2 is an end elevational view of a hydrostatic transmission unit and showing in end elevation portions of the proposed invention;

FIGURE 3 is a vertical sectional view taken generally along the line 3—3 of FIGURE 2;

FIGURE 4 is a side elevational view of the proposed control mechanism incorporated in a vehicle of the type depicted in FIGURE 1;

FIGURE 5 is an end elevational view of the portions of the vehicle shown in the preceding view;

FIGURE 6 is an end elevational view of certain of the components of the proposed control mechanism, and FIGURE 7 is a fragmentary view, in enlarged detail, of the double spring assembly in the control mechanism.

Figure 1:
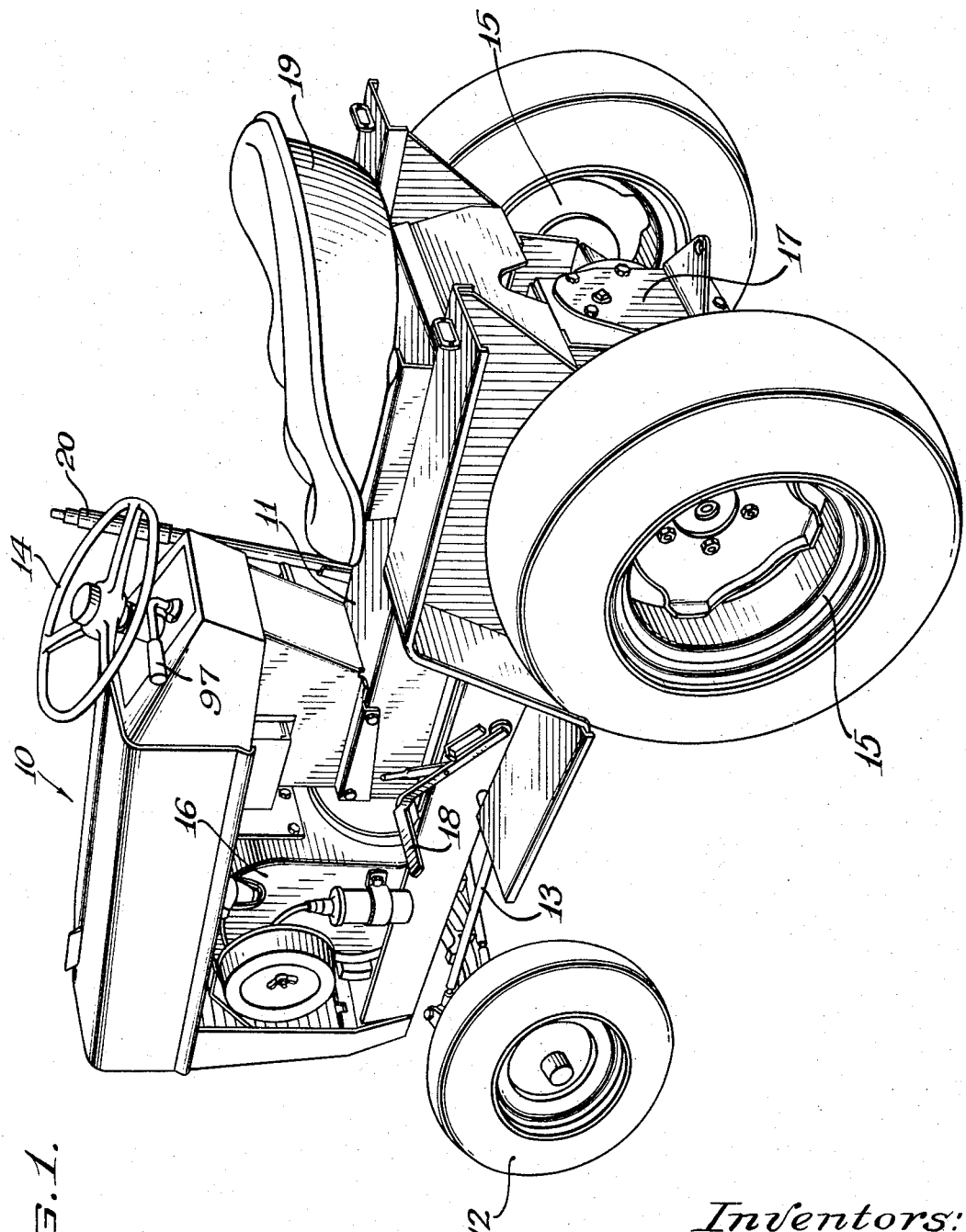
FIGURE 1 is a perspective view of a tractor vehicle of the type adapted for incorporating the proposed invention therein.

Reference being made now to the drawings hereof it will be seen that the proposed control mechanism is depicted incorporated in a tractor vehicle, indicated generally by the reference numeral 10, including as components thereof a frame 11, front mounted steerable wheels 12 (one only of which is shown) operable through a linkage mechanism indicated generally at 13 and interconnected with an operator controlled steering wheel 14. A pair of rear drive or traction wheels 15, 15 suitably supporting the frame by means not shown are operatively interconnected to one another and to the tractor motive power or engine 16 by a final differential drive unit indicated generally at 17 of well known construction while a brake pedal 18 interconnects by suitable linkage with braking means for braking the rear wheels 15, 15. A suitable seat such as shown at 19 may be provided as well as a control lever 20 adapted for connection by suitable linkage mechanism not shown for operating implement hitching mechanism that may optionally be mounted on the vehicle. However, inasmuch as many of the foregoing components form no particular cooperative function with relation to the proposed invention further description or illustration of the construction thereof is believed unnecessary to a proper understanding of the invention.

The engine 16 may be operatively connected by well known driving means not shown to a driveshaft 21 that extends into a hydrostatic transmission unit, indicated generally by reference numeral 22 (FIGS. 2 and 3), suitably supportably carried by the vehicle frame by means not shown. The transmission unit will be seen to comprise a housing 23 and a cover plate 24 detachably secured thereto and aligned therewith by any suitable means such as the bolts 25 and aligning pins 26. The drive shaft 21 which may extend through the transmission and out beyond the opposite side thereof may have the oppositely extending end of the shaft adapted for connection by suitable means to a power take-off device (not shown) such as may frequently be fitted to such vehicles.

Drive shaft 21 is journalled at one end in a bearing means 27 disposed in a bearing plate 28 affixed to cover-plate 24 by suitable means such as the fastening bolts 29, with the opposite end being journalled by a bearing 30 mounted in housing 23, while an intermediate portion of said shaft may be journalled as shown by a bearing 31 mounted in cover plate 24. Bearing 31 may also provide pilot support for a valve plate 32 which is constrained against rotation about shaft 21 by a pin 33 mounted in cover plate 24. A cylinder block or barrel member 34 mounted by splines 35 on shaft 21 is constrained for rotation therewith. Said barrel member as fashioned provides a plurality of axially extending cylinders such as 36 each of which is adapted to reciprocally receive a piston 37 therein while the outer ends of said pistons are suitably mounted by ball and socket means 38 in a slipper member 39 covered with a slipper retainer 40. Slipper member 39, in turn, is disposed in a sliding contact and abutting relation with a swash plate member 41.

Swash plate 41 is mounted on trunnion shafts such as 42, 42a and constrained for rotation therewith by suitable means such as the pins 43. The trunnion shafts, in turn, are journalled at 44, 44a in housing 23 and snap rings 45, 45a, positioned over outwardly extending end portions of said trunnion shafts in well known fashion, serve to limit axial displacement of these shafts. Suitable liquid seals, such as indicated at 46, may be provided one on each of said trunnion shafts to limit flow of fluid therealong as is well understood.

An enlarged diameter portion 21a, of shaft 21, may function to provide a shoulder for receiving a washer-like member 47 that abuttingly seats one end of a spring 48 the opposite end of which spring seats against a washer-like member 49, that, in turn, abuts a snap-ring 50 disposed in an annular recess in a bore 51 provided in barrel member 34, and the reaction of said spring serves to maintain barrel member 34, valve plate 32 and cover plate 24 in closely abutting relation in a manner well understood for such devices. The foregoing may be said to comprise the hydraulic drive pump component of the hydrostatic transmission unit.

Also disposed within housing 23 and cover plate 24 is the hydraulic motor component of the transmission unit which may be fashioned as hereinafter noted. A shaft 52 having one end thereof extending outwardly through housing 23 is journalled by a bearing 53 mounted in the housing, while an opposite end of the latter shaft is journalled by a bearing 54 mounted in a recess in cover plate 24. Bearing 54 may also provide pilot support for a valve plate 55 which is constrained against rotation about shaft 52 by a pin 56 mounted in cover plate 24, and a cylinder block or barrel member 57 mounted by splines 58 on shaft 52 is constrained for rotation therewith. Said barrel member as fashioned provides a plurality of axially extending cylinders such as 59 each of which is adapted to reciprocally receive a piston 60 therein, while the outer ends of said pistons are suitably mounted by ball and socket means 61 in a slipper member 62 covered with a slipper retainer 63. Slipper member 62, in turn, is disposed in a sliding contact and abutting relation with an inclined swash plate member 64 encircling shaft 52 and which is fixedly supported by housing 23 by suitable means, not shown. An enlarged diameter portion 52a, of shaft 52, may function to provide a shoulder for receiving a washer-like member 65 that abuttingly seats one end of a spring 66 the opposite end of which spring seats against a washer-like member 67 that, in turn, abuts a snap-ring 68 disposed in an annular recess in a bore 69 provided in barrel member 57, and the reaction of said spring serves to maintain barrel member 57, valve plate 55 and cover plate 24 in closely abutting relation in a manner well understood for such devices. The immediately preceding described component may be said to comprise the hydraulic motor component of the hydrostatic transmission unit, and the outwardly extending end of shaft 52 thereof is adapted for operative drive connection with the differential rear wheel drive unit 17.

It will be understood that suitable fluid-carrying conduits or passages will be provided interconnecting the valve plate elements of the hydraulic drive pump and motor components as well as for connecting the transmission unit to the remainder of the hydraulic system (not shown) all of which are in accordance with well known practices in the art and since these particular elements constitute no specific part of the present invention a detailed showing and résumé of the construction and disposition thereof was believed unnecessary to a full comprehension of the invention.

Since the present invention envisages mechanism for controlling a hydrostatic transmission unit such as hereinabove described, some elements of which are also included in copending U.S. patent application Serial No. 532,256, there are detailed below the mechanisms which represent the more specific teachings of the invention. Accordingly there is provided a driven arm member 70 mounted on an outwardly extending end portion of trunnion shaft 42 that is constrained for rotation with said shaft, by suitable means such as the welds indicated at 71. Said arm may be fashioned as shown in FIGURE 2, to provide a generally vertically extending portion 70a with a portion 70b extending generally horizontally from the upper end of portion 70a and having a rectangular-shaped slot or opening 72 proximate the free end of portion 70b. A drive plate member 73 has an aperture 74 therein dimensioned to permit said plate being rotatably positioned over the outwardly extending end portion of trunnion shaft 42, and a snap ring 75 on shaft 42 operates to fixedly position said plate in closely abutting relation with a portion of the driven arm member 70. An adjusting set screw 73a threadably mounted in said drive plate is provided for a purpose which will be subsequently explained. A rectangular slot or opening 76 in drive plate 73 is positioned and dimensioned to loosely accommodate the insertion therethrough of the slotted end portion 70b of arm 70. A second or secondary slotted opening 77 in drive plate 73 is dimensioned so that the length thereof generally corresponds with the long dimension of slot 72, in arm 70, and is adapted to receive a spring device, indicated generally by the reference numeral 78, in a slightly pre-stressed or pre-loaded condition therein. Although the degree or amount of such pre-loading may be varied according to individual circumstances it has been found that a loading in the order of 4 to 5 pounds has proven quite satisfactory for the proposed application. It will be appreciated, also, that a variable rate spring such as the well known conical-shaped helical coil spring may be substituted for the form of spring illustrated herein without deviating from the teachings of the inventive concepts hereof. In the form illustrated herein the spring means 78 may be fashioned as comprising a pair of button-like elements 79, 80 positioned in slots 72 and 77 with one each such member disposed at opposite ends of slot 77, with a coil spring 81 of light resistance positioned over outwardly extending portions 79a and 80a of said buttons while opposite ends of spring 81 abuttingly engage flange portions 79b and 80b of said buttons, and circumscribing spring 81 is a spring 82 of considerably heavier resistance. Spring 82 is shorter in length than spring 81 and will not extend far enough axially to abut both button flange portions 79b and 80b when the intersecting members 70 and 73 are disposed in positions corresponding to a neutral position of the hydrostatic transmission unit. It will be understood, of course, that the light spring 81 is so positioned in a lightly loaded or pre-stressed condition as heretofore discussed. Hence initial movement of arm 70 relative to plate 73 is resisted only by spring 81, but when this displacement exceeds a predetermined amount the buttons 79 and 80 are additionally brought into engagement with opposite ends of the heavy spring 82 whereby further movement of said arm and plate members is then resisted by both of said springs to produce a spring rate that may be said to be non-uniform.

A cam plate 83 is pivotally mounted at 84 to a mounting bracket 85 affixed by suitable means such as the bolts 86 passing through slotted openings 85a in said bracket onto frame 11. Cam plate 83 is also provided with a cam slot 87 having a generally straight portion 87a joining a curved portion 87b at one end thereof. Slidably disposed in said cam slot is a follower member comprising a stud 88 having a portion suitably fixedly mounted in drive plate 73 and an outwardly extending portion dimensioned for slidable disposition in the cam slot.

The cam slot 87 is so designed that when the follower element 88 is in portion 87a thereof the swash plate will be tilted to provide forward drive for the vehicle and the length of the slot is correlated with the degree of swash plate tilt required to produce the maximum vehicle speed in the forward direction. The profile of this portion of the slot in the cam plate is such that the rate of change or displacement of the follower element will be non-uniform, and the profile additionally is such that the rate of change initially when moving away from neutral is very small but such rate of change gradually increases as the cam plate is rotated and the vehicle speed is increased. In this manner the initial movement of the swash plate away from the neutral position thereof is very slow thus minimizing the starting shock pressures in the hydrostatic loop of the transmission. The portion 87b of said cam slot is correlated with the tilt of the swash plate to produce movement of the vehicle in the reverse direction, and since it is desirable that the maximum speed of the vehicle in reverse be approximately one-half that of the forward speed the swash plate need be tilted through a much smaller angle than for forward drive. Accordingly the length of the cam slot for reverse direction operation is considerably less than that for forward operation. Likewise, since the maximum speed in reverse is less than the forward maximum speed the profile of the cam slot portion 87b is designed so that the change or angular displacement may be somewhat less and the cam slot portion 87b is fashioned to accommodate this difference.

A ball joint coupling 89 may be secured by suitable fastening means 90 to the end of cam plate 83 opposite of that containing cam slot 87, and said coupling in turn is adjustably connected to one end of a rod or link member 91 the opposite end of which is adjustably connected to a ball joint coupler 92. Coupler 92 is suitably affixed to one end of a link or lever 93 the opposite end of which is fixedly mounted on a shaft 94 and constrained for rotation therewith. Shaft 94 is rotatably mounted in a generally U-shaped support bracket 95 affixed by suitable means such as the screws 96 to the frame 11, and a control handle 97 extending from the outer end of said shaft provides a means for operator control thereof. A suitable holding or retaining means for holding control handle 97 against accidental displacement from a preselected position thereof may comprise a sleeve 98 slipped over shaft 94 and affixed thereto by a pin 99 and having a pair of friction washers 100 and 100a positioned over said sleeve and disposed on opposite sides of an arm 95a of support bracket 95 and backed up with clamping washers 101 and 101a disposed in annular recesses 102 and 102a respectively in said sleeve. A spring 103 positioned over said sleeve is compressibly disposed between washer 101a and a spring seat cup 104 backed up by an adjusting nut 105 threadably mounted on the sleeve. As illustrated the shaft 94 is designed for hand operation by the operator but it is readily conceivable that such operation could be foot controlled and hence the invention should not be limited to the specific mechanism shown in the preferred embodiment.

The outwardly extending end of shaft 52 of the hydraulic motor component has a gear 106 fashioned thereon that meshes with a gear 17a drivingly interconnected by means not shown with the differential final drive unit 17 and may be fashioned as a portion thereof. A conventional friction braking mechanism shown generally by reference numeral 107 is disposed to frictionally engage with web portions of gear 17a and is actuated by an energizing member such as the rod 108 suitably connected to the braking mechanism by means not shown while the opposite end of said rod abuttingly engages an adjusting screw 108a threadably mounted in one arm of a somewhat Z-shaped actuating member or crank 109 pivotally mounted at 110 on frame 11. As disposed, said adjusting screw is adapted to provide free-play or lost-motion between the energizing rod 108 and crank or actuating member 109 the purpose of which will subsequently be explained. An opposite end of crank 109 is pivotally connected at 111 to a brake member such as the rod 112 whose opposite end is pivotally connected at 113 to an arm 114a of a bellcrank 114 fixedly mounted on shaft 115 by suitable means such as the pin 115a and said shaft in turn is suitably journalled in the vehicle frame, while the pedal together with said shaft and an arm of said bellcrank connecting rod 112 and crank 109 comprise what may be termed brake actuating means. The pedal 18 is mounted on one end of shaft 115 and constrained for rotation therewith by suitable means not shown. Another arm 114b of the bellcrank is pivotally connected at 116 to a clevis 117 threadably affixed to one end of a connecting rod 118 while a third arm 114c on said bellcrank is connected to a brake return spring 119 the opposite end of which is anchored in an aperture 120 in a portion of frame 11. The opposite end of connecting rod 118 is suitably anchored by a pivot pin 121 to a sliding block device indicated generally by reference numeral 122.

The sliding block member 122 includes a body portion 123 with an aperture 124 therein dimensioned to slidably receive the control handle shaft 94 therethrough, a back wall portion 125 with a slot 126 therein adapted to slidably accommodate a pin 127 fixedly mounted in support bracket 95, and a pair of side flange members 128 and 129 spaced so as to straddle and slidably accommodate shaft 94 therebetween. Portions of the outwardly extending edges of said flanges are fashioned with inclined camming surfaces 128a and 129a adapted to engage an abutment or follower member such as the pin 130 that is mounted in shaft 94 and projects outwardly from opposite sides thereof. The mechanism that includes member 112, bellcrank 114, connecting rod 118 and sliding block member 122 may be termed an interlocking or overriding means as will subsequently be understood.

Because of the well known mechanical and hydraulic characteristics of hydrostatic transmissions it is occasionally necessary to effect adjustment of the hydraulic and mechanical neutral position in order to avoid creep of the vehicle. In the present invention simplified means are provided to permit such adjustment to be readily accomplished. Initially the driven arm 70 and drive plate 73 are rotated until hydraulic neutral position of the swash plate in the pump is attained at which time no drive is being transmitted to the motor of the unit whereupon the set screw 73a is tightened down against frame 11 to securely fix said drive plate in the neutral position thus obtained. Next cam plate 83 is repositioned after loosening bolts 86 and moving the cam plate by way of slotted openings 85a until an indexing arrow marker 131 on said cam plate is aligned with the center line of follower stud 88 extending through slot 87 in said cam plate. Thereafter the mechanical linkage interconnecting cam plate 83 with control handle 97 is adjusted by lengthening or shortening as required until said handle is indexing the neutral position whereupon mechanical neutral will have been attained. Since both hydraulic and mechanical neutral has been accomplished for the mechanism the set screw 131 may now be released to permit rotational movement of drive plate 73.

*Operation*

Since the details of operation of hydrostatic transmissions are well known to those skilled in the art, and since the hydraulic pump and motor components illustrated herein are generally conventional it is believed that no detailed elaboration of these operations need be recited herein. Suffice it to say that operation of shaft 21 by engine 16 actuates the associated hydraulic pump and provides a flow of fluid in the hydrostatic loop interconnecting said pump and the hydraulic motor whereupon the flow of fluid in said motor displaces the piston elements 40 therein and their reaction against the fixed swash plate 64 causes barrel member 57 and output shaft 52 to rotate at the speed and in the direction desired. Since shaft 52 is drivingly conected through final drive differential unit 17 with rear drive wheels 15, 15 the operation of said shaft effects a corresponding movement of said wheels and propulsion of the vehicle. The position of swash plate 41, as is well known, determines the output of the hydraulic drive pump unit and varies with the degree said swash plate is tilted away from its neutral position which is one wherein said swash plate is substantially normal to the axis of rotation of barrel member 34. As this output varies so does the output or drive of the hydraulic motor of the transmission, hence the power transmitted to the drive wheels will be varied in accordance therewith. The direction of drive transmitted to drive wheels 15, 15 is, of course, determined by the direction of flow of fluid in the hydrostatic loop interconnecting the pump and motor components of the transmission unit and this, in turn, is determined by the forward or rearward tilt of swash plate 41 away from its neutral position.

In the operation of the proposed mechanism control handle 97 initially rotated to a selected position such for instance as for forward direction of the vehicle, or clockwise rotation (as viewed in FIGS. 4, 5 and 6), whereupon the interconnected linkage including lever 93 and rod 91 causes cam plate 83 to rotate counterclockwise about its pivot to follow such handle movement, and, acting through cam slot 87 and follower 88, imparts a corresponding angular displacement to drive plate 73. Upon rotational displacement of said drive plate there is imparted by way of spring means 78 a corresponding rotative movement to driven arm 70 the rotation of which effects a tilt of swash plate 41 to a degree and in a direction that is correlated with the amount and direction of movement of control handle 97 thereby producing the driving effect desired in the traction wheels of the vehicle all as further described in detail in copending U.S. application Ser. No. 532,256. At the time this action is undertaken brake pedal 18, by virtue of the reactive force of return spring 119 acting through bellcrank 114, will normally have been moved to its fully raised position, and concomitant therewith arm 114*b* of said bellcrank will have caused connecting rod 118 to slide the sliding block member 122 upwardly to a point where the follower pin 130 carried by shaft 94 will be out of engagement with the cam surfaces and the end edge portions of flanges 128 and 129 of said sliding block, thus permitting free rotation of control handle shaft 94. However, when brake pedal 18 is depressed, such as when preparing to slow down or stop the vehicle, the linkage, including shaft 115, bellcrank 114 and connecting rod 118, interconnecting said pedal with sliding block 122 is operative to cause said block to slide downwardly (as viewed in FIGS. 4, 5 and 6) along control handle shaft 94 thereby bringing cam 128*a* on flange 128 into engagement with follower pin 130, which upon clockwise rotation of shaft 94, had been brought into close positioning with said cam. Further movement of block 122 thereupon causes said cam to effect a rotative displacement of said pin which pin being fixed to control shaft 94 carries with it the latter shaft and thus returns control handle 97 to its neutral position. During the initial phase of the operation the brake pedal will have been depressed approximately halfway without effecting any braking action on the traction wheels because the free-play or lost-motion adjustment obtained by positioning of adjusting screw 109 thereof is such that the brakes will not start their braking action until the transmission has been conditioned for its neutral position. Further depression of the brake pedal will then begin application of braking action on the rear wheels, at the same time pulling block 122 downward to a position such that the follower pin 130 will have passed the upper end of cam 128*a* and will then engage the adjacent flat end edges of flanges 128 and 129 along which the pin may ride or slide without displacement of control shaft 94, thus providing what may be termed a null point or neutral area. When brake pedal 18 is released return spring 119 brings it back to its raised position while the interconnected linkage simultaneously raises sliding block 122 away from position to engage pin 130 thus permitting control handle 97 to be moved forwardly or rearwardly as desired.

When control handle 97 is moved rearwardly, or counterclockwise as viewed in FIGS. 4, 5 and 6, to provide reverse motion for the vehicle the swash plate will be tilted in the opposite direction, and pin 130 will be positioned for engagement by cam 129*a* on the opposite flange member 129 to effect movement of said pin and the associated control handle shaft in an opposite direction upon depression of brake pedal 18 in a manner similar to that previously explained.

From the above it will be seen that the proposed mechanism provides a novel means of interlockably or over-ridingly coupling a braking mechanism with the speed and directional control mechanism of a hydrostatic transmission incorporated in the vehicle which coupling insures that the operator will not brake the vehicle while the engine power is being applied to the traction wheels thereof, and further assures that engine power cannot accidentally be applied to the traction wheels so long as the brake pedal is depressed sufficiently to cause activation of the braking mechanism relative to the traction wheels of the vehicle.

While a certain representative embodiment and details have been shown for the purpose of illustrating the invention, it will be apparent to those skilled in the art that various changes and modifications may be made thereon without deviating from the spirit or scope of the invention.

What is claimed is:

1. In a vehicle having an engine and traction wheels with a hydraulic pump and motor transmission system operatively connected therebetween and with said system including a swash plate tiltable in one direction from a neutral position for varying the transmission ratio of the system with the vehicle moving in one direction and tiltable in an opposite direction form a neutral position for varying the transmission ratio of the system with the vehicle moving in an opposite direction, and braking mechanism for braking the vehicle, a control mechanism, comprising: means for controlling the tilt of the swash plate including control actuating means pivotally mounted on a support and rotatable in either direction from a neutral position for selectively positioning the swash plate in any one of a plurality of positions for establishing corresponding transmission ratio settings for the system; brake actuating means operable for energizing the braking mechanism and including an actuation member rotatably mounted on the vehicle; interlocking means operatively connected to said brake actuating means for movement therewith and cooperative with said control actuating means for returning the latter means to its neutral position upon rotation of the actuation member of said brake actuating means.

2. The invention according to claim 1 and further characterized in that the actuating member of said brake actuating means includes a foot operated pedal connected thereto.

3. The invention according to claim 2 and further characterized in that said brake actuating means includes adjustable means for providing free play between said means and the braking mechanism whereby the foot operated pedal is depressed a predetermined distance before being operative for energizing the vehicle braking mechanism.

4. The invention according to claim 1, but further characterized in that said control actuating means includes an abutment member constrained for rotation therewith, and further in that said interlocking means includes camming means engageable with said abutment means for rotatively displacing said control actuating means upon movement of the interlocking means.

5. In a vehicle having an engine and traction wheels with a hydraulic pump and motor transmission system operatively connected therebetween and with the pump thereof having a swash plate tiltable in one direction from a neutral position for varying the transmission ratio of the system with the vehicle moving in one direction and tiltable in an opposite direction from neutral for varying the transmission ratio of the system with the vehicle moving in an opposite direction, and a braking mechanism having an energizing member extending therefrom, a control mechanism, comprising: means for controlling the tilt of the swash plate including control handle means pivotally mounted on a support and rotatable in either direction from a neutral position for selectively positioning the swash plate in any one of a plurality of positions for establishing corresponding transmission ratio setting for the system; brake actuating means mounted on the vehicle and engageable with the energizing member for operating the braking mechanism; said brake actuating means including lost-motion means cooperative between said brake actuating means and the energizing member whereby said brake actuating means is moved a predetermined amount before engaging the energizing member; and overriding means operatively connected to said brake actuating means for movement therewith and engageable with said control handle means for effecting the return of the latter means to a neutral position upon operation of said brake actuating means.

6. The invention according to claim 5 but further characterized in that said brake actuating means includes a foot operated pedal member depressible for operating said actuating means, and further in that said overriding means includes spring means interconnected between the latter means and the vehicle and reactive for returning the pedal member and said overriding means to inoperative positions when the force depressing said pedal member is removed therefrom.

7. The invention according to claim 5, but further characterized in that said control handle means includes a shaft pivotally mounted within a bracket supportably carried by the vehicle, and in that said shaft carries a follower member constrained for rotation therewith, and further in that said overriding means includes a block member slidably mounted on said bracket and telescoped over said shaft for slidable movement therealong and having flanges providing cam surfaces extending from either side of the block member for slidable engagement with said follower member.

8. The invention according to claim 7, but further characterized in that the cam surfaces on the flanges of said block member each include a first portion inclined to the axis of rotation of the control handle shaft that is effective upon sliding of said block for engaging said follower and causing a rotative displacement of said shaft to a neutral position, and a second portion formed by an end edge of the respective one of said flanges and extending parallel to the axis of rotation of the control handle shaft that is effective for engaging said follower and restricting rotative displacement of the control handle means.

9. The invention according to claim 7 and further characterized in that said overriding means includes a three-armed bell crank pivotally mounted on the vehicle and having the first arm thereof fashioned to provide an element of the brake actuating means and having the second arm thereof pivotally connected by a link member to the sliding block member and having the third arm thereof connected to a return spring anchored to the vehicle.

10. The invention according to claim 7, and further characterized in that said control handle means includes adjustable friction means mounted over said shaft and cooperative between said shaft and said bracket for fixedly positioning the control handle against displacement from any one of a plurality of preselected rotatively displaced positions.

No references cited.

A. HARRY LEVY, *Primary Examiner.*